United States Patent [19]

Takashi et al.

[11] 4,449,774
[45] May 22, 1984

[54] ELECTROCONDUCTIVE RUBBERY MEMBER AND ELASTIC CONNECTOR THEREWITH

[75] Inventors: Nogami Takashi, Tokyo; Mitsuhashi Masayuki, Saitama, both of Japan

[73] Assignee: Shin-Etsu Polymer Co., Ltd., Tokyo, Japan

[21] Appl. No.: 343,346

[22] Filed: Jan. 27, 1982

[30] Foreign Application Priority Data

Feb. 5, 1981 [JP] Japan ................................ 56-16209
Feb. 24, 1981 [JP] Japan ................................ 56-25742

[51] Int. Cl.³ ............................................... H01R 9/00
[52] U.S. Cl. ........................... 339/59 M; 339/DIG. 3; 428/85; 428/91
[58] Field of Search .................................. 428/90–91, 428/922, 85, 323; 339/59 M, 60 M, 61 M, DIG. 3

[56] References Cited

U.S. PATENT DOCUMENTS

| | | | |
|---|---|---|---|
| 3,436,245 | 4/1969 | Grundman | 428/90 X |
| 3,900,651 | 8/1975 | Hoppe et al. | 428/90 X |
| 4,050,756 | 9/1977 | Moore | 428/133 X |
| 4,199,637 | 4/1980 | Sado | 428/119 |
| 4,201,435 | 5/1980 | Nakamura et al. | 428/372 X |
| 4,252,391 | 2/1981 | Sado | 428/119 X |
| 4,303,735 | 12/1981 | Kehrer et al. | 428/289 X |
| 4,408,814 | 10/1983 | Takashi et al. | 339/59 M |

FOREIGN PATENT DOCUMENTS

2087665  5/1982  United Kingdom ............ 339/75 M

*Primary Examiner*—Henry F. Epstein
*Attorney, Agent, or Firm*—Hopgood, Calimafde, Kalil, Blaustein & Judlowe

[57] ABSTRACT

The invention provides a novel electroconductive rubbery member which is a shaped body of a conductive rubbery elastomer impregnated with a powdery conductive particulate material such as carbon black or a metal powder dispersed in an insulating rubber, in which a multiplicity of conductive fibrous bodies such as carbon fibers or very thin metal wires are embedded in such oriented dispersion that each of the fibrous bodies lies along a line which intersects the surface of the shaped body and at least a part of the fibrous bodies are protruded out of the surface of the shaped body. By virtue of the protruded fibrous bodies, very reliable electric conduction is obtained between the conductive rubbery member and the metal electrode in contact therewith. Further advantages are obtained by providing an insulating coating film of, preferably, an adhesive on the contacting surface of the conductive rubbery member penetrated by the protruded conductive fibrous bodies. The inventive conductive rubbery members are also useful as the conductive parts of an elastic connector having an alternately stratified structure of conductive rubbery strata and insulating rubbery strata.

15 Claims, 10 Drawing Figures

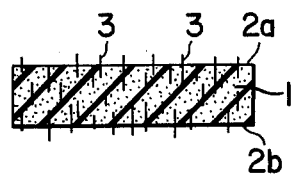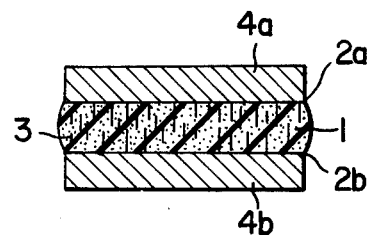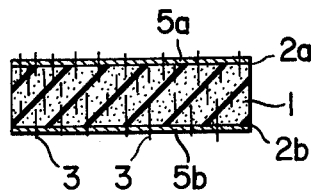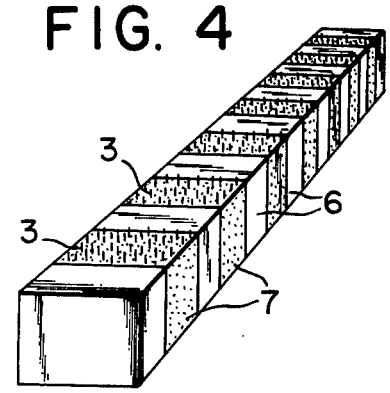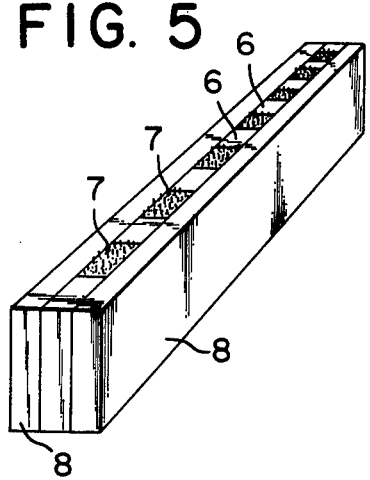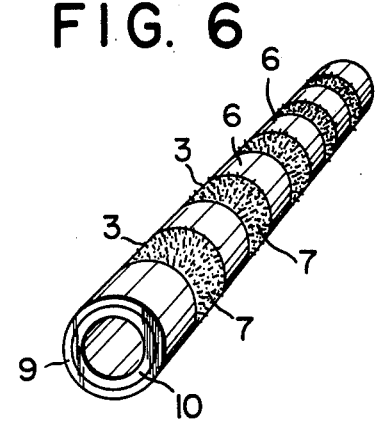

ELECTROCONDUCTIVE RUBBERY MEMBER AND ELASTIC CONNECTOR THEREWITH

BACKGROUND OF THE INVENTION

The present invention relates to a novel electroconductive rubbery member capable of giving improved electric connection and an elastic connector constructed with such a rubbery member.

In recent years, there is a growing demand for electroconductive rubbery materials as a member in elastic connectors, material of the contact points in push button switches, electroconductive shield gasket and the like.

Since rubbery polymers are in general non-electroconductive or insulating, such an electroconductive rubbery member is obtained by molding or shaping a rubber compound formulated with a large volume of an electroconductive particulate material such as carbon black or a metal powder as dispersed in the matrix of an insulating rubber polymer in order to impart electroconductivity. It is of course that high electroconductivity or low resistance of the rubbery material is obtained only by incorporating an increased amount of the conductive dispersant material into the rubber.

When the amount of the conductive dispersant is small, the rubbery material can be imparted with no satisfactorily high conductivity while an excessively large amount of the conductive dispersant is undesirable from the standpoint of the mechanical properties of the rubbery material. For example, a conductive rubber formulated with a large volume of the conductive dispersant is relatively rigid with high hardness and the elasticity thereof is greatly reduced so that, when such a rubbery member is sandwiched between or contacted with metal electrodes, the electric conduction between the metal electrode and the rubbery member is sometimes incomplete unless a very large contacting pressure is applied to the contacting surface of, for example, the conductive gasket. The increase in the contacting pressure on the conductive rubbery member naturally requires correspondingly high strengths of other parts or structure of the electric or electronic instruments on which the conductive rubbery member is mounted so that the flexibility in the design of the instrument is greatly reduced in addition to the disadvantage due to the more massive structure to withstand the large contacting pressure.

Another serious difficulty in the electroconductive rubbery member of the above described type is the relatively low reliability in the electric conduction between the rubbery member and the contacting electrode due to the deposition or adherence of certain insulating foreign materials such as grease on the contacting surface. In connection with the above problem, a conductive rubbery material formulated with a metal powder as the conductivity-imparting dispersant is susceptible to the influence of the atmospheric air by the oxidation or sulfurization of the surface of the metal particles exposed on the contacting surface or directly beneath the contacting surface leading to an uncontrollable decrease of the electric conduction.

In order to avoid the above described difficulties in the conductive rubbery materials, there have been made various attempts in the art. For example, there are known conductive rubbery materials in which the conductivity-imparting dispersant is, in place of the particulate conductive material mentioned above, a conductive fibrous material such as carbon fibers or very thin metal wires dispersed in the insulating rubber as oriented or aligned in the direction perpendicular to the contacting surface to give anisotropic electroconductivity to the rubbery member by the contact between the ends of the fibers exposed on the contacting surface and the electrode in contact therewith (see, for example, Japanese Patent Kokai No. 52-65892 corresponding U.S. patents are U.S. Pat. Nos. 4,199,637 and 4,252,391 to Sado).

A problem in such a conductive rubbery member containing the fibrous conductive dispersant in orientation is the decreased elastic resilience of the member in the direction of the electric conduction because the elasticity of the conductive fibers in the oriented dispersion is very low in comparison with the rubber matrix so that the compressive deformation of the rubber is greatly disturbed due to the low deformability of the conductive fibers dispersed therein when the compressive force is in the direction of the oriented fibers.

When an excessively large compressive force is applied to such a conductive rubbery member with a fibrous conductive material in oriented dispersion, on the other hand, the conductive fibers sometimes undergo permanent deformation leading to the permanent compression set of the rubbery member in the direction of contacting compression and also to sinking of the ends of the conductive fibers below the contacting surface or eventually to the break of the conductive fibers to cause decrease in the reliability of the electric conduction between the rubbery member and the contacting electrode.

The above described problems in the electroconductive rubbery materials are particularly serious in elastic electric connectors used to make electric connection between circuit boards or between a circuit board and an electronic display unit in various kinds of electric and electronic instruments such as electronic watches and clocks, pocketable electronic calculators, electric household appliances, controlling units in automobiles and the like. The elastic connector of the most widely used type is an tiny elongated body having a stratified structure constructed with alternate stratification of electroconductive strata and insulating strata both made of rubbery materials so that the connector is conductive in the direction perpendicular to the length of the body but insulating in the longitudinal direction of the body.

Because of the generally very small dimensions of the connector or, in particular, the very small thickness of each of the strata, the problem of the low reliability in the electric conduction is very serious in comparison with the conductive gasket or other relatively large conductive rubber articles. For example, an elastic connector of the above described stratified structure in which the conductive rubber strata are imparted with conductivity by formulating silver powder is susceptible to the problem of the inter-strata short circuiting when used in a highly humid atmosphere due to the migration of silver toward the surface.

SUMMARY OF THE INVENTION

An object of the present invention is therefore to provide a novel and improved electroconductive rubbery member free from the above described problems and disadvantages in the prior art products.

Another object of the invention is to provide an elastic connector formed by use of the above mentioned improved electroconductive rubbery members as parts of the stratified body so that very reliable electric conduction is readily obtained with a relatively small compressive force.

The electroconductive rubbery member of the present invention comprises a shaped body made of an electroconductive rubbery elastomer having two opposed surfaces and a multiplicity of electroconductive fibrous bodies each having a length substantially smaller than the thickness of the said shaped body between the two opposed surfaces and embedded in the said shaped body in such oriented dispersion that each of the fibrous bodies lies approximately along a line which intersects at least one of the said opposed surface, at least a part of the fibrous bodies being protruded at the end portions thereof out of at least one of the said two opposed surfaces.

In a modification of the above described electroconductive rubbery member, the surface of the shaped body of the electroconductive rubbery elastomer is covered with a coating film of an insulating material such as an adhesive agent and the end portions of the conductive fibrous bodies embedded in the shaped body and penetrating the film are protruded or not protruded out of the surface of the coating film.

The elastic connector of the invention is typically an integrally stratified body composed of alternate stratification of strata made of an insulating rubbey elastomer and strata made of an electroconductive rubbery elastomer, each of the conductive strata comprising a multiplicity of electroconductive fibrous bodies embedded therein and protruded out of the surface of the conductive stratum. The exposed surface of the conductive strata, out of which the conductive fibrous bodies are protruded at the end portions thereof, may be covered with a coating film of an insulating material such as an adhesive agent as mentioned above.

BRIEF DESCRIPTION OF THE DRAWING

FIG. 1 is a cross sectional view of the conductive rubbery member according to the invention showing protrusion of the conductive fibrous bodies out of the opposed surfaces of the conductive rubbery shaped body.

FIG. 2 illustrates the inventive member shown in FIG. 1 as sandwiched by two metal electrodes on the contacting surfaces by the cross section.

FIG. 3 is a cross sectional view of the inventive conductive rubbery member provided with the insulating coating films on both of the contacting surfaces.

FIG. 4 is a perspective view of the elastic connector of stratified structure in which each of the conductive strata is the inventive rubbey member with protrusion of the conductive fibrous bodies.

FIG. 5 is a perspective view of an elastic connector similar to that in FIG. 4 laterally integrated with insulating plates.

FIG. 6 is a perspective view of a tubular elastic connector according to the invention.

DETAILED DESCRIPTION OF THE PREFERRED EMBODIMENTS

Figure 7:
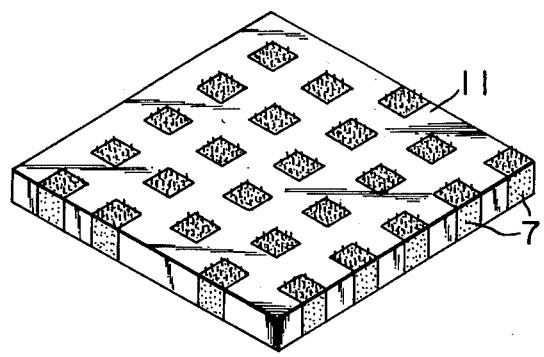
FIG. 7 is a perspective view of an elastic connector having island-wise discrete conductive portions.

The shaped body of an electroconductive rubbery elastomer, which defines the contour of the inventive electroconductive rubbery member, is made of a conductive rubbery elastomer which may be a conventional rubbery composition obtained by dispersing a particulate dispersant material having conductivity such as carbon black, metal powders, metal-plated glass beads and the like in a rubber, e.g. natural rubber and various kinds of synthetic rubbers, or a synthetic resin exhibiting rubber-like elasticity after curing in a sufficiently high loading amount.

In FIG. 1 illustrating a cross sectional view of a typical one of the inventive conductive rubbery members, the shaped body 1 is in the form of a sheet having two surfaces 2a, 2b substantially parallel with each other and contains a multiplicity of conductive fibrous bodies 3 embedded therein in oriented dispersion, each of the fibrous bodies 3 lying approximately along the direction perpendicular to the above mentioned two parallel surfaces 2a and 2b or the direction the the thickness of the sheet-like shaped body 1.

The length of each of the fibrous bodies 3 is substantially smaller than the thickness of the shaped body between the two parallel surfaces so that each of the conductive fibrous bodies 3 can be in a straightened disposition without curving in the shaped body 1.

The conductive fibrous bodies 3 may be conventional graphitized or ungraphitized carbon fibers or very fine wires of a metal as used in conventional anisotropic electroconductive rubbery materials. The diameter of the fibrous bodies 3 is not particularly limitative but it is preferably in the range from 1 to 1000 m or, more preferably, from 1 to 200 m when the conductive rubbery member is used as a material for the conductive portions in the elastic connectors, as a material for the contact point of a push button switch or as a material of a conductive shield gasket. The length of the fibrous bodies is also not particularly limitative provided that the length is substantially smaller than the thickness of the shaped body in the meaning stated above. It is of course that the length of a fibrous body is sufficiently larger than the diameter thereof. The length is usually at least 30 m on an average but it is sufficient that a fibrous body of a diameter of 1 m has a length of 5 m.

The amount of the conductive fibrous bodies dispersed in the conductive rubbery material is not particularly limitative but it is usually in the range from 1 to 100 parts by volume per 100 parts by volume of the conductive rubber as the matrix to exhibit the desired effect as described below.

In the following, the procedure for preparing the inventive conductive rubbery member is described. Thus, the above mentioned conductive fibrous material and a particulate conductive material, e.g. carbon black or metal powder, are blended and kneaded with an insulating rubbery polymer to be dispersed therein and then the rubber compound is shaped into a sheet or rod under a unidirectional shearing force by a conventional molding method such as extrusion molding or calendering. The conductive fibrous bodies are torn in the step of kneading to have suitable shorter lengths as mentioned above and then oriented in the matrix of the conductive rubbery material in the course of shaping by virture of the above mentioned unidirectional shearing force to be aligned in the direction of extrusion or calendering.

The sheet or rod of the conductive rubbery material obtained by extrusion or calendering in the above described manner is then subjected to curing of the rubber, preferably, under tension. It is usual that rubbery materials exhibit considerable shrinkage by curing followed by cooling. For example, a silicone rubber cured by heating at 180 C. and cooled to room temperature exhibits a linear shrinkage of about 2.5% or more. Despite the considerable shrinkage of the rubbery matrix by curing, followed by releasing of the tension, almost no shrinkage takes place in the conductive fibrous bodies embedded in the rubbery matrix in oriented dispersion so that the fibrous bodies are under strong compressive force in the cured rubbery matrix. When such a cured rubbery body is fabricated into desired form by cutting in a plane perpendicular to or at a somewhat biased angle relative to the direction of orientation of the fibrous bodies, i.e. the direction of extrusion or calendering, the fibrous bodies under the compressive stress are released from the stress at the newly formed surface of section so that the end portions of the fibrous bodies are protruded out of the surface as is shown in FIG. 1.

The length of the protruded end portions of the conductive fibrous bodies is, as is understood from the above given description of the manufacturing process, determined automatically according to the manufacturing process or by the amount of shrinkage of the rubbery matrix by curing but it is usually in the range from 5 to 500 m. It is important that the rootage portion of the protruded fibrous body is sufficiently long in order not to readily come off the surface of the shaped body. In this connection, it is sometimes effective to treat the fibrous bodies with a primer or an adhesive before blending with the rubbery matrix. Meanwhile, distribution of the conductive fibrous bodies in the shaped body of the conductive rubber may not be uniform throughout the body but may be more dense in the vicinity of the surface than in the core portion of the shaped body.

Owing to the above described unique structure with protruded conductive fibrous bodies 3, the conductive rubbery member illustrated in FIG. 1 by the cross section exhibits very advantageous behavior when it is used as sandwiched between two electrode plates made of, for example, a metal. FIG. 2 illustrates the conductive rubbery member of FIG. 1 sandwiched between two metal electrodes 4a, 4b each in contact with the parallel surfaces 2a or 2b, respectively, under an appropriate contacting pressure. When the metal electrode 4a or 4b is brought toward the surface 2a or 2b, the protruded ends of the conductive fibrous bodies 3 first come into contact with the metal electrode 4a or 4b and, when the metal electrode 4a or 4b is further pressed against the surface 2a or 2b with increased contacting pressure, the microscopic surface area of the shaped body 1 surrounding each of the protruded fibrous bodies is depressed below the original surface accompanying the fibrous body being pushed down.

Since the length of protrusion of the conductive fibrous bodies 3 are not uniform in the range, for example, from 5 to 500 m as is mentioned above, the fibrous body with a larger length of protrusion is pushed down more deeply than the fibrous body with a smaller length of protrusion when the metal electrode 4a or 4b is further pressed against the surface 2a or 2b to come into contact therewith. As a consequence, the metal electrode 4a or 4b is contacted with substantially all of the end portions of the conductive fibrous bodies which have been protruded out of the surface 2a or 2b before the metal electrode 4a or 4b is applied to the surface.

When the contacting pressure between the metal electrodes 4a and 4b is further increased, good electric conduction is established between the metal electrode 4a or 4b and the surface 2a or 2b of the conductive rubbery shaped body 1 with high reliability. It is noted that application of an excessively large contacting pressure should be avoided because the protruded end portion of the fibrous body may eventually be broken or permanently deformed. The compressive deformation of the shaped body 1 by the further increase of the contacting pressure is not disturbed by the presence of the conductive fibrous bodies 3 as embedded in the body 1 since the length of each of the fibrous bodies 3 is substantially smaller than the thickness of the shaped body 1 in the direction of the contacting pressure.

FIG. 3 illustrates a cross section of a conductive rubbery member of the invention as a modification of the member shown in FIG. 1. As is shown in this figure, the surfaces 2a and 2b of the conductive shaped body 1 are covered with respective coating films 5a and 5b although it is optional that only one of the surfaces 2a and 2b is covered with the coating film 5a or 5b. The coating film 5a or 5b is electrically insulating and made by applying an insulating coating composition containing a vehicle of a conventional synthetic resin or rubber, an adhesive agent formulated with a urethane-based rubber, dienic rubber of silicone rubber or a hot-melt adhesive by a method of dipping, printing, brush coating, spraying or other suitable method. Alternatively, the insulating coating film 5a or 5b can be formed by applying a pre-shaped film of an adhesive material to the surface 2a or 2b of the shaped body 1 under an appropriate pressure to be integrated therewith.

The thickness of the insulating coating film 5a or 5b on the surface 2a or 2b of the shaped body 1 is preferably smaller than the length of the protruded end portions of the conductive fibrous bodies 3 out of the surface, that is, 5 to 500 m, for example, as is mentioned before. However, it is sometimes optional that the thickness of the coating film 5a or 5b is larger than the length of the protruded end portions of the fibrous bodies 3 depending on the rheological property of the material of the insulating coating film 5a or 5b that, when a metal electrode is contacted with the surface of the member, the coating film 5a or 5b is plastically or elastically deformed and flows so as to ensure contacting between the ends of the conductive fibrous bodies 3 and the electrode to establish electric conduction.

When the insulating coating film 5a or 5b in the inventive conductive rubbery member illustrated in FIG. 3 is formed of an adhesive, an unexpected advantage is obtained as described below. That is, such a conductive member can be pressed against and bonded with a metal electrode or other body under a sufficient contacting pressure outwardly applied to ensure good electric conduction therebetween and the hardening or curing of the adhesive is conducted under the load of the contacting pressure followed by the release of the contacting pressure to retain good electric conduction even without the contacting pressure. The mechanism of this unexpectedly good electric conduction is presumably as follows. When the protruded end portions of the conductive fibrous bodies 3 are brought into contact with the surface of the electrode penetrating the layer of the insulating coating film 5a or 5b, the fibrous bodies 3 are pushed down toward the conductive rubbery shaped body 1 with resilient contacting with the surface of the electrode at the ends thereof and this state is fixed by the hardening or curing of the adhesive so that the conductive fibrous bodies 3 are resiliently contacted with the electrode even by the release of the outer contacting pressure. This means that the conductive rubbery member can be mounted in a narrow space without a suitable contacting pressure using no clamping means so that a great practical advantage is obtained.

FIG. 4 and following figures illustrate the application of the above described inventive conductive rubbery members.

FIG. 4 is a perspective view of an elastic connector which as a whole is an elongated piece having an alternately stratified structure composed of the strata 6 made of insulating rubbery elastomeric members and the strata 7 made of conductive rubbery members integrally bonded together along the longitudinal direction of the stratified body. Each of the conductive strata 7 is the inventive conductive rubbery member and, as is shown in the figure, the end portions of the conductive fibrous bodies 3 are protruded on at least one of the exposed surfaces of each of the strata 7.

FIG. 5 is a perspective view of an elastic connector obtained by integrally sandwiching the connector shown in FIG. 4 with two insulating members 8 at the surfaces not pertaining to the electric conduction through the conductive strata 7.

FIG. 6 is a perspective view of a tubular elastic connector which is obtained by integrally wrapping an insulating rubbery tube 10 with a striped sheet 9 prepared by slicing a stratified body such as shown in FIG. 4 adhesively bonded to the core tube 10.

Figure 8:
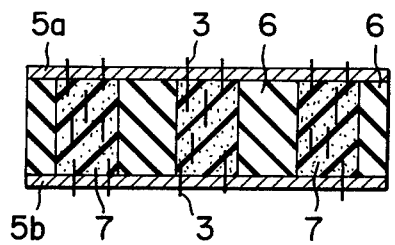
FIG. 8 is a cross sectional view of an elastic connector of the invention provided with the insulating coating films on both of the contacting surfaces.

FIG. 7 is a perspective view of an elastic sheet connector in which the conductive rubbery members 7 are discretely embedded in an insulating rubber sheet 11. The connector of this type is prepared by integrally bonding together a plurality of the connectors shown in FIG. 4 and a plurality of the connectors shown in FIG. 5 side by side. FIG. 8 shonws a cross sectional view of an elastic connector similar to that shown in FIG. 4. In this case, the upper and lower contacting surfaces of the connector are covered with insulating coating films 5a and 5b not only on the conductive strata 7 but also on the insulating strata 6 integrally and some of the end portions of the conductive fibrous bodies 3 embedded in the conductive strata 7 in oriented dispersion are protruded penetrating the insulating coating films 5a and 5b.

Figure 9:
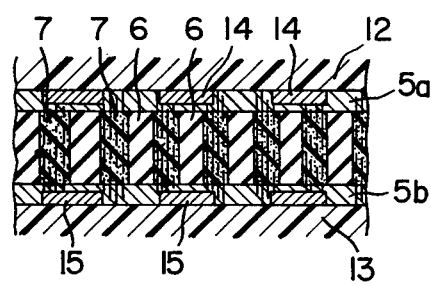
FIG. 9 illustrates the elastic connector of FIG. 8 sandwiched with two metal electrodes by the cross section.

FIG. 9 illustrates such an elastic connector mounted between two electronic circuit elements 12 and 13, such as a liquid crystal display unit and a driving circuit board therefor, each provided with a set of the parallel contacting terminals 14 or 15. When the elastic connector is sandwiched by the two circuit elements 12 and 13 under an appropriate contacting pressure, the ends of the conductive fibrous bodies 3 protruded out of the contacting surfaces of each of the conductive rubbery members 7 of the strata penetrating the insulating coating films 5a and 5b come into contact with the surfaces of the contacting terminals 14, 15 and the conductive fibrous bodies 3 thus contacted with the contacting terminals 14, 15 are pushed down toward the conductive rubbery members 7 along with bending. Although the lengths of the end portions of the conductive fibrous bodies 3 protruded out of the conductive strata 7 are not uniform, the fibrous body 3 with longer protrusion is pushed down more deeply toward the member 7 than those with shorter length of protrusion so that the end portions of all of the protruded fibrous bodies come into contact with the surface of the contacting terminals 14, 15.

With further increase of the contacting pressure at this state, the insulating coating films 5a and 5b are contacted with the contacting terminals 14, 15 and then plastically or elastically deformed to fill the space between the connector and the circuit elements 12, 13 eventually to leave no void space along with the compressive deformation of the elastic connector per se. This feature is advantageous when the connector is used in a highly humid atmosphere due to the absence of the danger of dew condensation in the void space. When the insulating coating films 5a and 5b are formed of an adhesive and cured or hardened in this state of consolidated contacting of the connector and the circuit elements 14, 15, very reliable electric conduction is obtained between the oppositely positioned pair of the contacting terminals 14 and 15 on the respective circuit elements 12 and 13 through one or more of the conductive rubbery members 7 even by the removal of the outer contacting pressure using a clamping means.

In carrying out the mounting of the inventive elastic connector in the above described manner, an additional advantage is obtained when the insulating coating films 5a and 5b on the opposite surfaces of the connector are formed of hot-melt type adhesives having different melting temperatures. Assuming that the melting point of the insulating coating film 5b on the lower surface of the connector shown in FIG. 9 is higher than that of the insulating film 5a on the upper surface, the circuit element 13 is first bonded to the elastic connector at the lower surface thereof by melting the insulating coating film 5b and then the adhesive bonding is performed between the other circuit element 12 and the upper surface of the connector at the lower melting temperature of the insulating coating film 5a without affecting the adhesive bonding between the circuit element 13 and the lower surface of the connector by virture of the higher melting temperature of the insulating coating film 5b than the film 5a. Stepwise mounting of the elastic connector and the circuit elements in this manner greatly contributes to the automatization of the assembling works of the instruments. Similar advantages may be obtained by the combined use of two adhesives for the insulating coating films 5a and 5b having different curing velocities or different curing temperatures.

Figure 10:
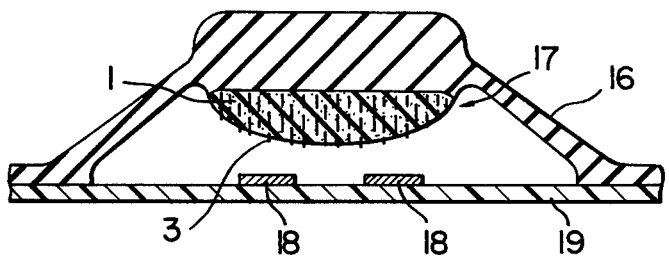
FIG. 10 is a cross sectional view of a push button switch in which the movable contact point is a conductive rubbery member of the invention.

FIG. 10 illustrates a cross sectional view of a push button switch with a covering pad 16 made of a rubbery material having a movable contact point 17 downwardly facing a pair of fixed contact points 18 on the printed circuit board 19 on which the covering pad 16 is mounted. The movable contact point 17 in this case is a conductive rubbery member according to the invention composed of the conductive rubbery matrix 1 and the conductive fibrous bodies 3 embedded in the matrix 1 in oriented dispersion with the end portions of some of the conductive fibrous bodies being protruded out of the lower surface of the conductive rubbery shaped body 1.

Although no illustrating figure is given here for a conductive shield gasket made of the conductive rubbery member of the invention, there may be no difficulty in understanding that such a shield gasket can be prepared by a mere mechanical working of the inventive member into any desired forms.

Following is a summary of the advantages obtained with the conductive rubbery members of the present invention.

(1) The condition of the electric connection is very stable between the contacting surface of the inventive member, on which the conductive fibrous bodies are protruded, and the surface of the electrode or contacting terminal and the change in the contact resistance is minimized even in the variation of the contacting pressure.

(2) The electric conduction between the inventive member and the electrode or contacting terminals is very reliable because, even when the surface of the inventive member or the electrode or contacting terminal is covered with greasy stain or an oxidized or sulfurized thin film, such a barrier layer is readily penetrated by the protruded end portions of the conductive fibrous bodies under a relatively small contacting pressure.

(3) Good electric conduction is obtained under a relatively small contacting pressure because the compressive deformation of the inventive rubbery member is never disturbed by the presence of the fibrous bodies within the shaped body since the lengths of the fibrous bodies are substantially smaller than the thickness of the shaped body in the direction of compression.

(4) The elastic resilience of the shaped body can be fully utilized so that good condition of electric conduction is ensured even under the influence of vibration or mechanical shock and close contact is obtained with an electrode or contacting surface to give excellent shielding effect.

(5) When the contacting surface of the inventive member or the elastic connector is covered with the insulating coating film, good protecting effect is obtained for the metal particles dispersed in the conductive shaped body from the adverse influence of oxidizing, sulfurizing or other polluting environmental atmosphere so that the resistance for the electric conduction is stabilized and highly reliable conduction can be maintained over a long period of time.

(6) When the insulating coating film on the contacting surface of the inventive member or elastic connector is formed of an adhesive, the working efficiency of mounting of the member or the connector or assemblage of the instruments can be greatly improved because no clamping means to ensure contacting pressure is required which is indispensable in the conventional conductive members or elastic connectors.

What is claimed is:

1. An electroconductive rubbery member which comprises a shaped body made of an electroconductive rubbery elastomer having two opposite surfaces and a multiplicity of electroconductive fibrous bodies each having a length substantially smaller than the thickness of the said shaped body between the two opposed surfaces and embedded in the said shaped body in such oriented dispersion that each of the fibrous bodies lies approximately along a line which intersects at least one of the said opposed surfaces, at least a part of the fibrous bodies being protruded out of at least one of the said two opposed surfaces of the shaped body.

2. The electroconductive rubbery member as claimed in claim 1 wherein the electroconductive rubbery elastomer making the shaped body is composed of an electrically insulating rubbery elastomer and an electroconductive particulate material dispersed in the said insulating rubbery elastomer.

3. The electroconductive rubbery member as claimed in claim 1 wherein each of the electroconductive fibrous bodies have a length of at least 30 m on an average.

4. The electroconductive rubbery member as claimed in claim 1 wherein each of the electroconductive fibrous bodies has a diameter in the range from 1 to 1000 m.

5. The electroconductive rubbery member as claimed in claim 1 wherein the length of the end portion of each of the electroconductive fibrous bodies protruded out of the surface of the shaped body is in the range from 5 to 500 m.

6. The electroconductive rubbery member as claimed in claim 1 which further comprises at least one electrically insulating coating film covering at least one of the two opposed surfaces of the shaped body, the end portions of the electroconductive fibrous bodies protruded out of the surface of the shaped body penetrating the said electrically insulating coating film.

7. The electroconductive rubbery member as claimed in claim 6 wherein the thickness of the electrically insulating coating film does not exceed the largest length of the end portions of the electroconductive fibrous bodies protruded out of the surface of the shaped body.

8. The electroconductive rubbery member as claimed in claim 6 wherein the electrically insulating coating film is formed of an adhesive material.

9. An elastic connector having an alternately stratified structure of strata of an electroconductive rubbery elastomer and strata of an electrically insulating rubbery elastomer integrally bonded together, each of the strata of the electoconductive rubbery elastomer comprising a multiplicity of eletroconductive fibrous bodies embedded therein in such oriented dispersion that each of the fibrous bodies lies approximately along a line which intersects at least one of the exposed surfaces of the stratum and at least a part of the fibrous bodies are protruded out of the surface of the stratum.

10. The elastic connector as claimed in claim 9 which further comprises at least one electrically insulating coating film covering the surface of the stratum of the electroconductive rubbery elastomer out of which at least a part of the electroconductive fibrous bodies are protruded, the end portions of the electroconductive fibrous bodies protruded out of the surface of the strata of the electroconductive rubbery elastomer penetrating the said electrically insulating coating film.

11. The elastic connector as claimed in claim 9 or claim 10 wherein each of the electroconductive fibrous bodies embedded in the strata of the electroconductive rubbery elastomer has a length of at least 30 m on an average.

12. The elastic connector as claimed in claim 9 or claim 10 wherein each of the electroconductive fibrous bodies embedded in the strata of the electroconductive rubbery elastomer has a diameter in the range from 1 to 1000 m.

13. The elastic connector as claimed in claim 9 or claim 10 wherein the length of the end portion of each of the electroconductive fibrous bodies protruded out of the surface of the strata of the electroconductive rubbery elastomer is in the range from 5 to 500 m.

14. The elastic connector as claimed in claim 10 wherein the thickness of the electrically insulating coating film does not exceed the largest length of the end portions of the electroconductive fibrous bodies protruded out of the surface of the strata of the electroconductive rubbery elastomer.

15. The elastic connector as claimed in claim 10 wherein the electrically insulating coating film is formed of an adhesive material.

* * * * *

UNITED STATES PATENT AND TRADEMARK OFFICE
CERTIFICATE OF CORRECTION

PATENT NO. : 4,449,774
DATED : May 22, 1984
INVENTOR(S) : Takashi Nogami, et al.

It is certified that error appears in the above—identified patent and that said Letters Patent is hereby corrected as shown below:

ON THE COVER PAGE

"Takashi et al." should read -- Nogami et al. --.

"Inventors:  Nogami Takashi, Tokyo; Mitsuhashi Masayuki, Saitama, both of Japan"

should read

-- Inventors:  Takashi Nogami, Tokyo; Masayuki Mitsuhashi, Saitama, both of Japan --.

UNITED STATES PATENT AND TRADEMARK OFFICE
CERTIFICATE OF CORRECTION

PATENT NO. : 4,449,774

DATED : May 22, 1984

INVENTOR(S) : Takashi Nogami, et al.

It is certified that error appears in the above—identified patent and that said Letters Patent is hereby corrected as shown below:

Column 10, claim 3, line 1, "30 m" should read -- 30 $\mu$m --.

Column 10, claim 4, line 6, "m" should read -- $\mu$m --.

Column 10, claim 5, line 11, "500 m" should read -- 500 $\mu$m --.

Column 10, claim 11, line 48, "30 m" should read -- 30 $\mu$m --.

Column 10, claim 12, line 54, "1000 m" should read -- 1000 $\mu$m --.

Column 10, claim 13, line 59, "500 m" should read -- 500 $\mu$m --.

Signed and Sealed this

Twenty-fourth Day of September 1985

[SEAL]

Attest:

DONALD J. QUIGG

Attesting Officer

Commissioner of Patents and Trademarks—Designate